T. B. JEFFERY, DEC'D.
K. E., C. T. & H. W. JEFFERY, EXECUTORS.
WHEEL.
APPLICATION FILED AUG. 26, 1909.
1,056,279.
Patented Mar. 18, 1913.
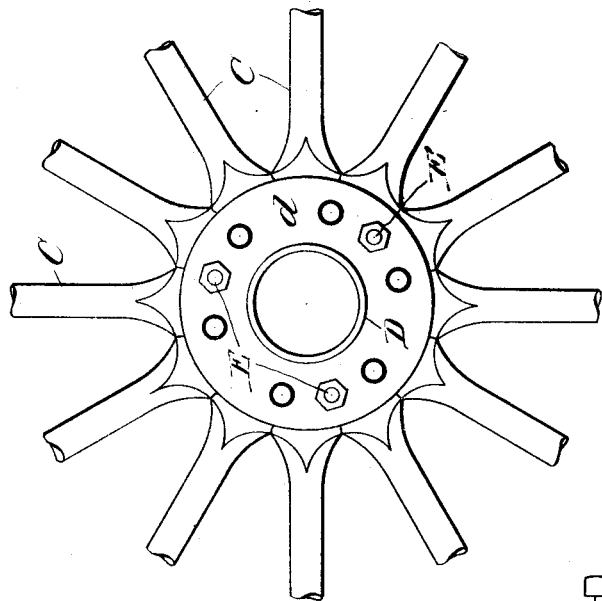
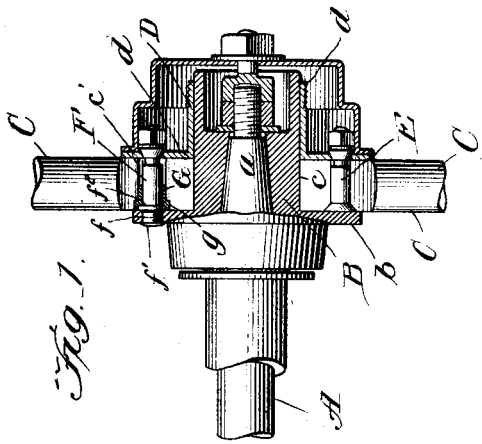
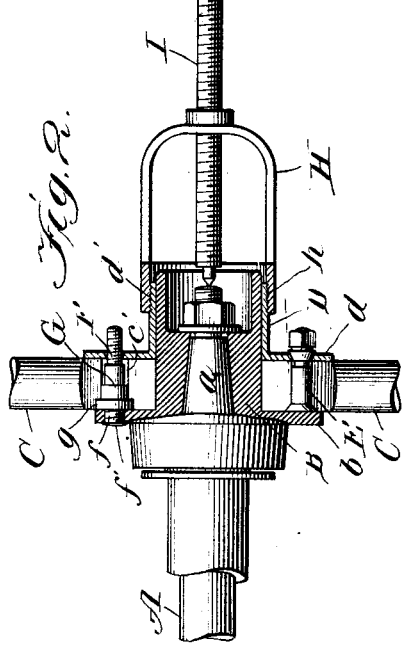
Witnesses:
Harry S. Gaither
Bruen Ashrith
Inventor:
Thomas B. Jeffery
by Chamberlin & Freudenreich
attys

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

WHEEL.

1,056,279.     Specification of Letters Patent.     Patented Mar. 18, 1913.

Application filed August 26, 1909. Serial No. 514,663.

*To all whom it may concern:*

Be it known that I, THOMAS B. JEFFERY, a citizen of the United States, residing at Kenosha, county of Kenosha, State of Wisconsin, have invented a certain new and useful Improvement in Wheels, and declare the following to be a full, clear, and exact description of the same, such as will enable others skilled in the art to which it pertains to make and use the same, reference being had to the accompanying drawings, which form a part of this specification.

In my prior application Serial No. 458,941, filed October 22, 1908, I have described a novel form of wheel which may readily be removed from the hub and replaced by a similar wheel in case of accident and the present invention has for its object to improve the construction described in such application.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a sectional view showing my improved wheel assembled upon a hub; Fig. 2 is a view similar to Fig. 1 showing the wheel in process of removal; and Fig. 3 is a side elevation with the hub cap removed.

Referring to the drawing, A represents an axle having a cone-shaped end $a$.

B is a hub detachably fitted upon the cone-shaped end of the axle and having an annular shoulder or flange $b$.

The wheel body consists of a series of radiating spokes C and a surrounding rim (not shown). The inner ends of the spokes are shaped so as to form a central opening $c$ sufficiently large to receive the hub.

D is a sleeve fitting snugly upon the hub and having an annular flange $d$ lying against one face of the spokes, the sleeve and its flange forming the usual hub flange. The hub flange is permanently secured to the wheel body by means of bolts E passing through the spokes and through the flange $d$. In order to secure the wheel body upon the hub I provide a second series of bolts F which are rigidly secured to the shoulder or flange $b$ in any suitable manner as, for example, by screwing them into the flange as at $f$ and then riveting the ends as at $f^1$ so as to prevent their removal. The bolts are long enough to pass entirely through the spokes and the member $d$. Each of the bolts F is provided with an enlargement $f^2$ which is adapted to bear against the shoulder or flange $b$. These enlargements serve to aline the bolts properly and make it difficult for them to be bent out of alinement. Consequently, by shaping the bolts and their enlargements accurately they will be forced to assume positions perpendicular to the flange on the hub and will be held rigidly in such positions.

One of the chief advantages of wheels constructed in this manner is that an extra wheel may be carried upon a vehicle in order that it may be substituted for one which has been damaged or whose tire has been disabled. It is therefore desirable that the construction be such as to make the operation of placing the wheel in position as simple and easy as possible. To this end I arrange within each of the openings $c^1$ through which the bolts F pass, a thimble or bushing G. The thimbles or bushings are arranged on the side of the wheel body opposite to that on which the hub flange is located and they preferably extend only a short distance into the wheel body. The bore of the sleeves or thimbles is preferably made such as to produce a nice sliding fit upon the bolts. It will be seen that the bushings or thimbles protect the bolt holes against injury or distortion either through swelling of the wood of the spokes or by reason of the wheel being struck upon the side. The openings $c^1$ are preferably made larger than the bolts so that the bolts remain out of contact with the wood, bearing only within the bushings. The thimbles are preferably provided with enlarged ends $g$ which fit snugly about the enlargements on the bolts F. A bearing is therefore obtained between the thimbles and the bolts throughout the entire lengths of the thimbles and a secure driving connection is obtained. Since the greatest driving strain comes upon the bolts at points adjacent to the flange on the hub, the provision of the enlargements on the bolts and on the bushings or thimbles insures great rigidity and consequently small danger of distortion since it is almost impossible to bend the bolts where they enter the flange on the hub by reason of the engagement of the enlargements on the bolts with the flange in the plane at right angles to the bolts, namely in the plane along which the pressure during driving is directed.

In order to remove the wheel from the hub I have provided a yoke, H screw-threaded at its end as at $h$ so as to coöperate with screw-threads $d^1$ upon the end of the hub flange.

I is a screw-threaded stud which passes through the yoke and is adapted to bear at one end against the end of the axle. When the nuts on the ends of the bolts F are removed and the yoke screwed in position, the removal of the wheel may be effected by turning the stud and gradually drawing the wheel toward the end of the hub.

While I have described in detail only a single preferred form of my invention, I do not desire to be limited to the particular structural details illustrated and described, but intend to cover all forms of my invention falling within the terms of the definitions thereof constituting the appended claims.

What I claim is:

1. A wheel comprising a hub, a wheel body having a sleeve shaped to fit upon the hub, said sleeve being screw threaded upon its exterior surface at its outer end, a member rigidly connected to the hub, a power device screw threaded upon the outer end of said sleeve and engaging with said member for forcing the wheel body from the hub.

2. A wheel comprising a hub having an annular shoulder, a wheel body having at the center an opening of a size to receive the hub, a sleeve shaped to fit the hub and having an annular flange at one end, means for rigidly uniting said flange to the wheel body, a series of studs carried by said annular shoulder and projecting through said wheel body and said flange, said studs having enlargements thereon adjacent to the ends which are connected with said shoulder, said enlargement bearing against said shoulder, and bushings arranged within the wheel body and shaped to fit upon said bolts and the enlargements thereon.

In testimony whereof, I sign this specification in the presence of two witnesses.

THOMAS B. JEFFERY.

Witnesses:
J. P. ZENS,
H. W. JEFFERY.